United States Patent [19]

Hashimoto et al.

[11] E Patent Number: Re. 32,177

[45] Reissued Date of Patent: Jun. 10, 1986

[54] SINGLE LENS REFLEX CAMERA

[75] Inventors: Akihiko Hashimoto, Tokyo; Tamotsu Koiwai, Nagano; Toyohiko Kimura, Tokyo, all of Japan

[73] Assignee: Olympus Optical Company Ltd., Tokyo, Japan

[21] Appl. No.: 438,003

[22] Filed: Nov. 1, 1982

Related U.S. Patent Documents

Reissue of:

[64] Patent No.: 4,306,791
Issued: Dec. 22, 1981
Appl. No.: 94,473
Filed: Nov. 15, 1979

[30] Foreign Application Priority Data

Feb. 8, 1979 [JP] Japan ..... 54/13866

[51] Int. Cl.[4] ..... G03B 15/05
[52] U.S. Cl. ..... 354/126
[58] Field of Search ..... 354/126, 129, 152, 140, 354/145.1, 202, 288, 173.1, 173.11

[56] References Cited

U.S. PATENT DOCUMENTS

| | | | |
|---|---|---|---|
| 3,559,548 | 2/1971 | Ackerman . | |
| 3,631,779 | 1/1972 | Hori | 354/145 X |
| 3,853,396 | 12/1974 | Ogiso et al. | 354/173 |
| 4,166,680 | 9/1979 | Maitani | 354/126 |

FOREIGN PATENT DOCUMENTS

| | | | |
|---|---|---|---|
| 2149223 | 4/1972 | Fed. Rep. of Germany | 354/126 |
| 2408156 | 9/1974 | Fed. Rep. of Germany | 354/202 |

*Primary Examiner*—Michael L. Gellner
*Attorney, Agent, or Firm*—Louis Weinstein

[57] ABSTRACT

A single lens reflex camera is provided which has a planar area for mounting a light emitting component such as an electronic flash thereon. The planar area is defined by at least a portion of top surface of a body of the camera which is located on one side of a pentaprism housing disposed centrally on the top surface, and is at a lower level than the remainder of the top surface which is located on the opposite side of the pentaprism housing. The planar area is formed with a threaded bore for mounting the light emitting component, and is also provided with a terminal connector having a plurality of terminals inclusive of a synchro contact terminal, an illumination control signal terminal and a power supply terminal.

17 Claims, 14 Drawing Figures

SINGLE LENS REFLEX CAMERA

Matter enclosed in heavy brackets [ ] appears in the original patent but forms no part of this reissue specification; matter printed in italics indicates the additions made by reissue.

BACKGROUND OF THE INVENTION

The invention relates to a single lens reflex camera, and more particularly, to a single lens reflex camera which permits a light emitting component such as an electronic flash or the like to be integrally secured thereto.

In the prior art practice, when securing a light emitting component such as an electronic flash on the body of a camera, a mounting member provided on the part of the component is inserted into a shoe which is detachably mounted on the body or into an accessory shoe on the body, and is integrally connected therewith as by friction, screw or click stop mechanism.

However, this technique suffers from a limited area for engagement between the component and the body of the camera which results in an insufficient mounting strength, whereby a reduced force applied to the component is great enough to damage the shoe and its mounting member or to cause a loosening of the shoe base. Since the shoe is a small member, any small looseness of the shoe base results in a rattling of the component, preventing a firm integral coupling between the component and the body of the camera.

SUMMARY OF THE INVENTION

It is an object of the invention to provide a single lens reflex camera which eliminates above disadvantages of the prior art, by providing a planar area on the top face of a body of a camera at least on one side of the location thereon where a pentaprism is disposed and in which which a threaded bore is formed for permitting a mounting of a light emitting component thereon and in which a plurality of connection terminals including synchro contact terminal are disposed, thus permitting the component to be integrally secured to the planar area.

It is another object of the invention to provide a single lens reflex camera of the type mentioned above in which the planar area for mounting a light emitting element such as an electronic flash is provided at a lower elevation than the top face located on the opposite side of the pentaprism, by clearing the space above the top surface of the camera body on the side where a film winding assembly is normally provided, by disposing a drive motor and a transmission mechanism which transmits the rotation of the motor to a film winding assembly in the bottom of the camera body, thereby utilizing the motor to wind and rewind a film.

In accordance with the invention, an increased area of coupling is provided between the light emitting element and the body of the camera to permit a firm integral coupling therebetween, thus minimizing a mechanical or electrical failure of the mating parts. When the light emitting component is mounted on the body, the entire assembly is still compact in size. In addition, the increased area of the planar region permits an increased number of connection terminals to be provided therein.

In accordance with another aspect of the invention, a drive motor and a transmission mechanism which transmits the rotation of the motor to a film winding assembly are disposed in the bottom of the body of the camera for effecting a film winding and rewind operation. In this manner, the space which has been normally utilized to provide the winding assembly can be cleared. In this manner, the planar area for mounting the light emitting component can be easily provided and can be formed at a lower elevation than the top surface of the body which is located on the film rewind side, namely, on the opposite side of the pentaprism housing from the planar area. The reduced elevation of the planar area permits the entire volume to be minimized when the component is mounted on the camera. Since the motor and the transmission mechanism are disposed in the bottom of the body, the latter need not be significantly increased in size.

DESCRIPTION OF PREFERRED EMBODIMENT

Figure 1:
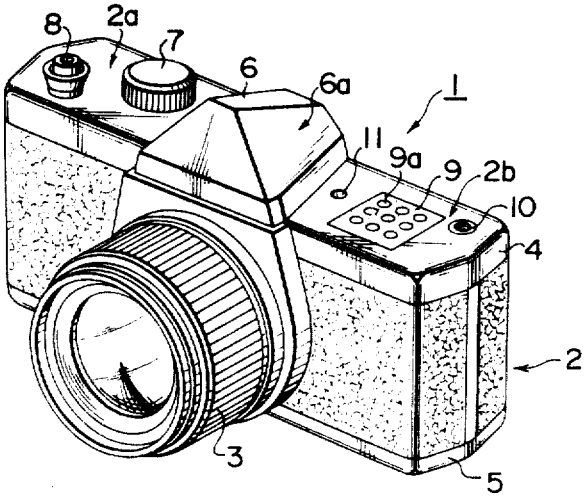
FIG. 1 is a perspective view of a single lens reflex camera according to one embodiment of the invention.

Referring to FIG. 1, there is shown a single lens reflex camera according to one embodiment of the invention in a perspective view. Camera 1 includes body 2, and lens barrel 3 which is mounted on the body. The top and bottom ends of body 2 are covered by upper and lower panels 4, 5 which are provided with downwardly and upwardly depending flanges around their periphery, respectively. The central portion of upper panel 4 is raised in the form of a roof, thereby providing pentaprism housing 6 in which a pentaprism is disposed. Disposed in top surface 2a which is located on the left-hand side, as viewed in FIG. 1, of pentaprism housing 6 are film speed presetting dial 7 and shutter release button 8. The top surface of body 2 which is located on the right-hand side of pentaprism 6 has a lower elevation than left-hand top surface 2a to provide planar area 2b on which a light emitting component such as an electronic flash may be mounted. Terminal connector 9 including a plurality of connection terminals 9a inclusive of synchro contact terminal, illumination control signal terminal and power supply terminal is centrally located in planar area 2b. Threaded bore 10 is formed to the right of terminal connector 9 for permitting a light emitting component such as an electronic flash to be mounted thereon, while positioning hole 11 is formed to the left of terminal connector 9.

Figure 2:
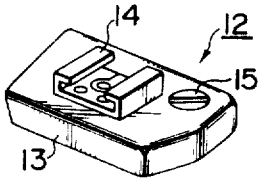
FIGS. 2 to 4 are perspective views of an accessory shoe and devoted electronic flashes which may be mounted on the body shown in FIG. 1.
Figure 4:
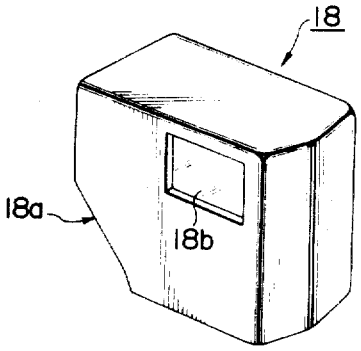
Figure 3:
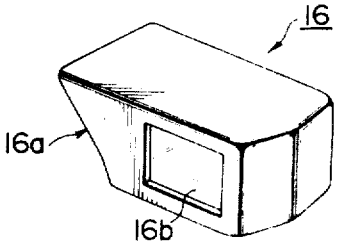

FIGS. 2 to 4 show several accessories such as an electronic flash which may be mounted on planar area 2b of camera 1. Specifically, FIG. 2 shows a commercially available accessory shoe member incorporating a hot shoe which permits the mounting of an electronic flash. Accessory shoe member 12 includes platform 13 having a height which corresponds to a difference in elevation between top surface 2a and planar area 2b and formed to cover the entire planar area 2b, hot shoe 14 which is centrally mounted on the upper surface of platform 13 and including a plurality of electrical contacts, mounting screw 15 which is rotatably received in platform 13 at a position corresponding to the location of threaded bore 10 formed in body 2, and a positioning dowel (not shown) which is adapted to fit in positioning hole 11 formed in body 2. Terminal connection member 20 is disposed in the lower surface of platform 13 for mating engagement with terminal conductor 9 on camera 1, as will be further described later in connection with FIGS. 10 to 12.

Figure 5:
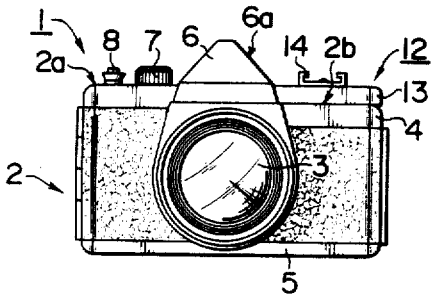
FIGS. 5 to 7 are front views of the camera shown in FIG. 1 when the accessory shoe and the devoted electronic flashes illustrated in FIGS. 2 to 4 are mounted thereon, respectively.

Accessory shoe member 12 can be integrally connected with body 2 by fitting positioning dowel (not shown) into positioning hole 11 and threadably engaging mounting screw 15 with threaded bore 10 formed in body 2. Thereupon, the upper surface of accessory shoe member 12 will be substantially at the same elevation as the top surface 2a of body 2 which is located to the left-hand side of pentaprism housing 6, as shown in FIG. 5, thereby providing a favorable balanced design. A commercially available electronic flash can be mounted on hot shoe 14, and hence camera 1 can be used with any commercial available electronic flash, in addition to devoted electronic flashes to be described later.

FIG. 3 shows one form of a devoted electronic flash which may be used with camera 1. Electronic flash 16 shown has a height which corresponds to a difference in elevation between the level of planar area 2b and the maximum height of pentaprism housing 6. Electronic flash 16 is generally rectangular in configuration, and its bottom surface and left-hand bevelled surface 16a are shaped for mating engagement with planar area 2b and right-hand side bevelled surface 6a (see FIG. 1) of pentaprism housing 6. Terminal connection member 20 is disposed in the lower surface of electronic flash 16 and is arranged to correspond to terminal connector 9 provided on the part of camera 1. Electronic flash 16 internally houses a main capacitor, a flash discharge tube and the like in the same manner as a conventional electronic flash, and is formed with window 16b on its front side through which flashlight illumination is emitted. Devoted electronic flash 16 does not contain a battery in itself, but is fed from a battery which is internally housed within body 2 of the camera as will be further described later.

Figure 6:
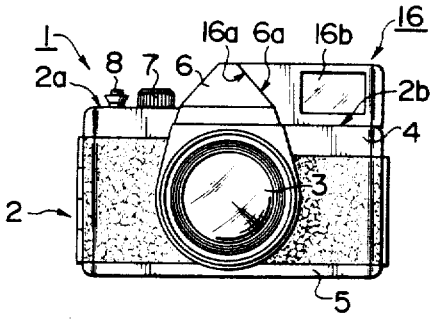
Figure 8:
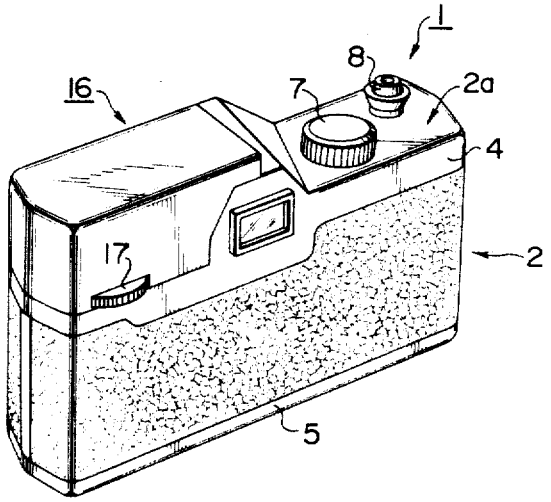
FIG. 8 is a perspective view of the single lens reflex camera shown in FIG. 1 with the devoted electronic flash of FIG. 3 mounted thereon, as viewed from the rear side.
Figure 9:
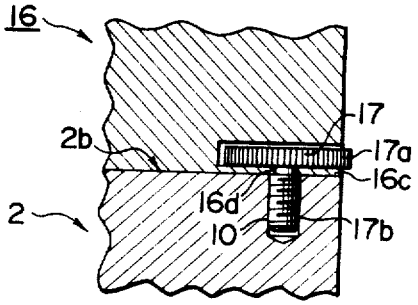
FIG. 9 is an enlarged elevational section of a mounting knob which is used to mount the devoted electronic flash shown in FIG. 3 on the camera.

Referring to FIG. 8, it will be noted that mounting knob 17 is disposed in the bottom of the rear side of electronic flash 16 toward its left-hand side so that it slightly projects beyond the rear surface thereof. Electronic flash 16 can be fixedly mounted on body 2 by using mounting knob 17. Specifically, referring to FIG. 9, knob 17 includes disc 17a which is peripherally knurled, and threaded bolt 17b which extends downwardly from the center of disc 17a and which is rotatably supported by passing through opening 16d formed in bottom wall 16c of electronic flash 16. When threaded bolt 17b is engaged with and screwed into threaded bore 10 formed in body 2, electronic flash 16 can be fixedly connected with body 2 by holding bottom wall 16c firmly between disc 17a and planar area 2b. When mounted in this manner, the upper surface of electronic flash 16 will be level with the maximum height of pentaprism housing 6 as shown in FIG. 6. The right-hand bevelled surface 6a is a snug fit with a left-hand bevelled surface 16a of electronic falsh 16 to prevent any rattling therebetween and assuring a sufficient coupling strength therebetween. Since electronic flash 16 does not contain any battery and hence is compact in size and light in weight, the entire size of the camera will be substantially unchanged when electronic flash 16 is mounted on body 2. Because the left-hand corner of electronic flash 16 smoothly merge into pentaprism housing 6, an ease is gained in operating the camera when electronic flash 16 is mounted thereon.

FIG. 4 shows another form of devoted electronic flash which may be used with camera 1. Electronic flash 18 shown in FIG. 4 has an increased size as compared with electronic flash 16 shown in FIG. 3 since it is constructed to contain a battery internally. Specifically, electronic flash 18 is generally rectangular in configuration having lower left-hand bevelled surface 18a which is adapted to mate with right-hand bevelled surface 6a of pentaprism housing 6 on the body 2. Terminal connection member 20 is disposed in the lower surface of electronic flash 18 and is arranged to correspond to terminal connector 9 provided on the part of camera 1. Electronic flash 18 is constructed in the same manner as electronic flash 16 to produce flashlight illumination, which is emitted through window 18b formed in the upper portion of its front side.

Figure 7:
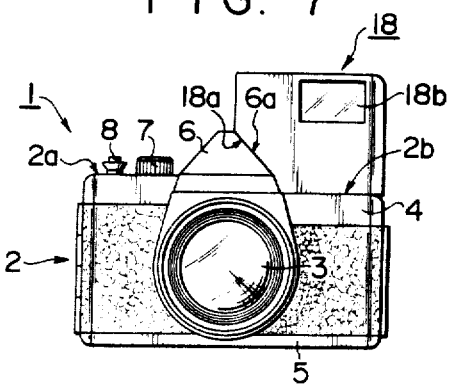

Electronic flash 18 is fixedly mounted on body 2 by utilizing a mounting knob disposed in the bottom of the right-hand portion of the rear side thereof generally in the same manner as electronic flash 16. When so mounted, bevelled surface 6a becomes a snug fit with bevelled surface 18a of electronic flash 18 as shown in FIG. 7. As a consequence, a sufficient coupling strength between electronic flash 18 and body 2 is obtained even though electronic flash 18 has an increased size in order to contain a battery therein.

Figure 10:
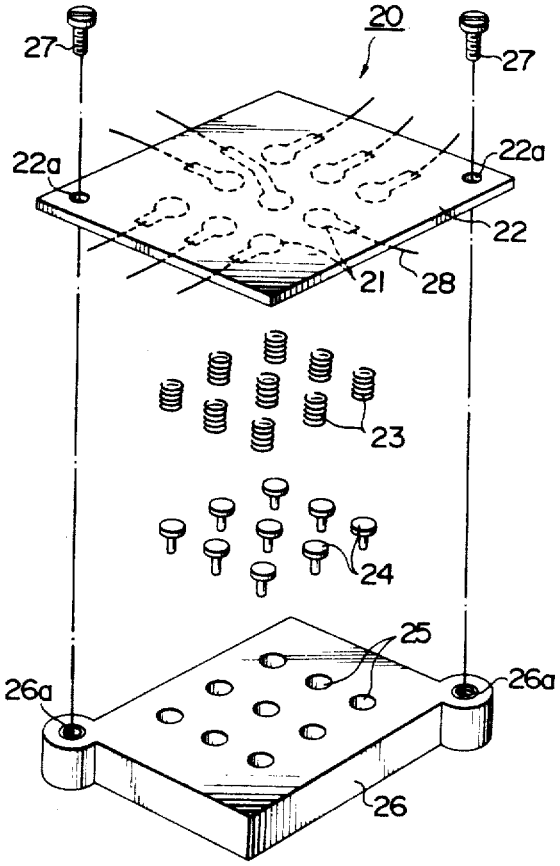
FIG. 10 is an exploded perspective view of a terminal connection member which is used in the accessory shoe and the devoted electronic flashes shown in FIGS. 2 to 4.

FIG. 10 shows an exploded perspective view of a terminal connection member which is disposed in the lower surface of accessory shoe member 12, or electronic flash 16 or 18 shown in FIGS. 2 to 4. Terminal connection member 20 comprises substrate 22 having a plurality of electrode patterns 21 imprinted thereon, a plurality of electrically conductive coiled springs 23, a plurality of electrically conductive terminals 24 which are equal in number to the number of springs 23, insulating plate 26 having a plurality of holes 25 formed therein which receive coiled spring 23 and terminals 24, and set screws 27 which connect substrate 22 and insulating plate 26 together.

Figure 11:
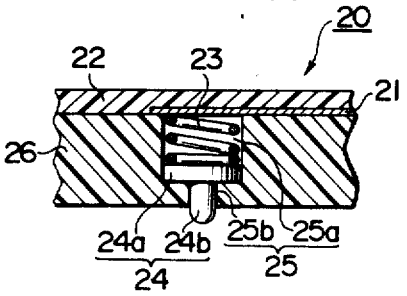
FIG. 11 is an enlarged cross section of one of connecting terminals provided in the terminal connection member shown in FIG. 10.

As is clearly shown in FIG. 11, connection terminal 24 comprises disc 24a which serves preventing the withdrawal of the terminal through the bottom of hole 25, and solid cylindrical contact 24b extending downwardly from the center of disc 24a and having a rounded lower end. Holes 25 formed in plate 26 are disposed so that they are in alignment with corresponding terminals 9a in the terminal connector 9 which is disposed on body 2 when accessory shoe member or electronic flash incorporating connection member 20 is mounted on the planar area 2b, and are equal in number to the number of these terminals 9a. Each hole includes upper portion 25a of an increased diameter and lower portion 25b of a reduced diameter which communicates with the upper portion 25a. Connection terminal 24 is initially inserted into hole portion 25a and then coiled spring 23 is placed thereon. When disc 24a bears against the step defined between portions 25a, 25b, the free end of contact 24b slightly projects from hole portion 25b beyond the lower surface of plate 26.

Substrate 22 is formed with openings 22a which are aligned with threaded bores 26a formed in insulating plate 26. By passing set screws 27 through openings 22a and engaging them with threaded bores 26a, the both members can be connected together. When so connected, substrate 22 prevents the withdrawal of coiled spring 23 and terminal 24 which are received in the hole 24. At this time, the upper end of spring 23 bears against one of electrode patterns 21 on substrate 22 while its other end abuts against terminal 24, thus providing a conductive path between one of electrode patterns 21 and terminal 24. In FIG. 10, lead wires extending from electrode patterns 21 are designated by numeral 28. Terminal connection member 20 is disposed in the lower surface of accessory shoe member 12 or electronic flashes 16, 18 so that the lower surface of insulating plate 26 is flush with the lower surface of such accessory shoe member or electronic flash.

Figure 12:
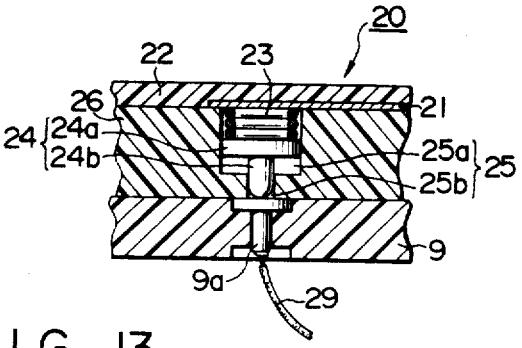
FIG. 12 is an enlarged cross section of the terminal shown in FIG. 11, illustrating the manner of interconnection.

When terminal connection member 20 is mounted on accessory shoe member 12 or electronic flash 16, 18 provided on body 2, an electrical interconnection is achieved as shown in FIG. 12 between terminal connector 9 and connection member 20. Specifically, the lower surface of connection member 20 bears against the upper surface of terminal connector 9 so that the free end of contact 24b of connection terminal 24 abuts against the upper surface of terminal 9a and is raised upward against the resilience of coiled spring 23. In this manner, a suitable pressure of contact is maintained between both terminals 24 and 9a. Hence, the electrical circuit of accessory shoe member 12 or electronic flash 16 or 18 and the electrical circuit provided on the part of body 2 are interconnected through a conductive path including lead wires 28, electrode patterns 21, conductive springs 23, terminals 24, 9a and lead wires 29.

Terminal connector 9 and terminal connection member 20 may include terminals which may be utilized as a synchro contact terminal, a terminal for transmitting an illumination control signal from a photometric circuit disposed within body 2, a charging complete signal terminal which may be utilized to transmit a signal indicative of the completion of a charging operation within the electronic flash to the camera, or a power supply terminal which may be used to feed an electronic flash from a battery contained within body 2.

Figure 13:
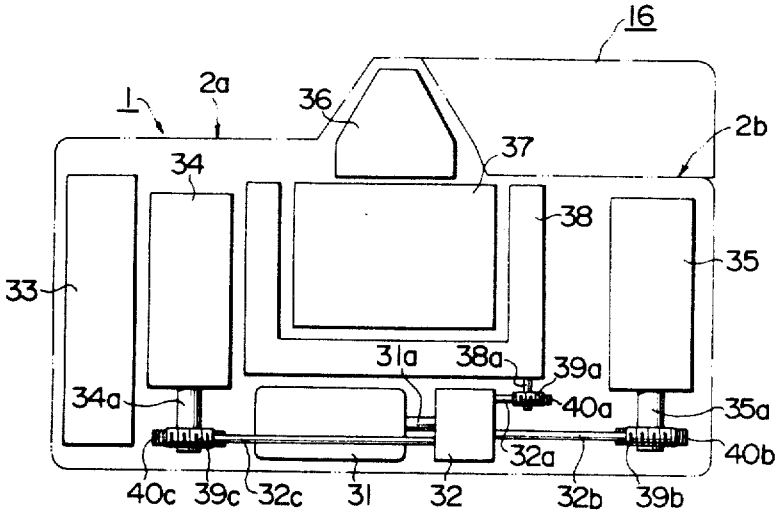
FIGS. 13 and 14 are schematic front and top views illustrating the layout of principal components contained in the single lens reflex camera shown in FIG. 1.
Figure 14:
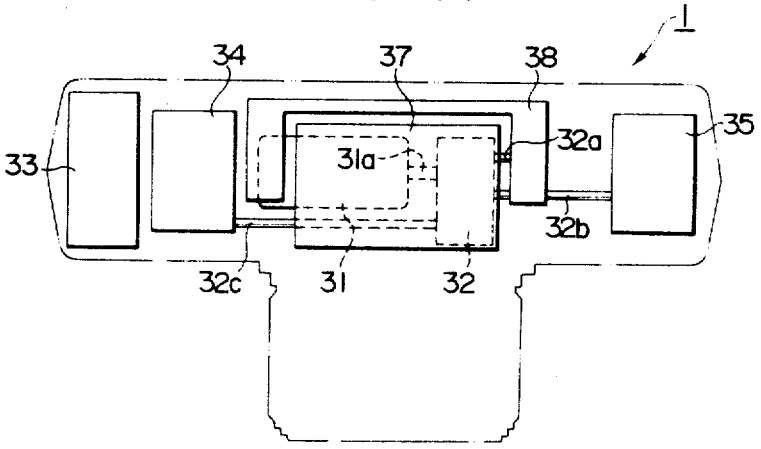

FIGS. 13 and 14 illustrate one possible layout of principal components within camera 1 to clear the space above the top surface of single lens reflex camera 1 in a region which is located on the right-hand side of pentaprism housing 6 and to form such planar area 2b at a lower elevation than the top surface 2a located on the left-hand side of pentaprism housing 6. Specifically, in the camera 1 shown, various operating members are removed from planar area 2b, and the number of parts disposed on left-hand side top surface 2a is also minimized. At this end, drive motor 31 is disposed in the bottom of body 2 and is utilized in combination with clutch mechanism 32 to supply a drive for winding or rewinding a film, vertically moving the mirror or charging the shutter.

Specifically, referring to FIGS. 13 and 14, film rewind assembly 34 including battery compartment 33 and patrone, and film winding assembly 35 including a spool are disposed in the left- and right-hand portions of camera 1. Pentaprism 36, movable reflecting mirror 37, shutter mechanism 38, drive motor 31 and clutch mechanism 32 are disposed in the central portion of camera 1. Drive motor 31 has output shaft 31a which is connected with clutch mechanism 32 having a plurality of rotating shafts 32a to 32c which are connected with shutter mechanism 28, film winding assembly 35 and film rewind assembly 34, respectively. Worms 39a to 39c are mounted on the free end of these rotating shafts 32a to 32c, and mesh with worm wheels 40a to 40c which are mounted on rotating shafts 38a, 35a, 34a associated with shutter mechanism 38, film winding assembley 35 and film rewind assembly 34, respectively. It is to be understood that the location of film winding assembly 35 and film rewind assembly 34 may be interchanged in the described arrangement.

When the principal parts of camera 1 are disposed in the manner mentioned above, a film winding or rewind operation can be achieved by operating drive motor 31, thus affording a practical convenience. Since the number of parts disposed on the top surface of body 2 is minimized, the appearance is improved and the manufacturing cost is reduced.

In a conventional single lens reflex camera, a film winding mechanism as well as an indicator which indicates the number of film frames taken are disposed on the right-hand top surface of the body of the camera, and occupy an increased space thereon. However, the use of drive motor 31 disposed in the bottom of body 2 permits these members which are normally disposed on the top surface of body 2 in a region where such film winding assembly 35 is located to be eliminated or removed to other location, thereby clearing the space above the top surface, which therefore can be substantially reduced in elevation.

It is to be understood that while the light emitting component such as an electronic flash has been described as mounted on the right-hand top surface of the body with respect to the pentaprism housing, it may be mounted on the left-hand side as well.

What is claimed is:

1. A single lens reflex camera internally housing a drive motor which is used to wind or rewind the film comprising a transmission connected to said drive motor for transmitting the rotation of the motor to a film winding assembly and film rewind assembly, said drive motor and said transmission being disposed in the bottom of the body of said camera, the top surface of the camera body having a pentaprism housing which is disposed substantially in its central region to project therefrom, said pentaprism housing having a pair of sides substantially symmetrically bevelled, such top surface of the camera body having a first surface on one side of the pentaprism housing and a second surface on the other side of said pentaprism housing, said first surface being formed at a lower elevation on said camera body than the elevation of said second surface to define a planar area in which a bore is formed, an accessory shoe member which comprises a platform having a height which corresponds to a difference in elevation between the planar area and the second surface of the camera located on the opposite side of the pentaprism housing and shaped to cover the planar area, said accessory shoe member including a mounting element to be received in said bore for mounting said accessory shoe member on said planar area, and a hot shoe centrally mounted on the upper surface of the platform for receiving a light emitting component.

2. A single lens reflex camera according to claim 1 in which said mounting element is a threaded bolt member and said bore comprises a threaded bore, and in which said accessory shoe member carries said threaded bolt member which is adapted to be threadably engaged with said threaded bore to fix said accessory shoe member on the planar area and in which the threaded bolt member comprises a mounting screw rotatably disposed in the accessory shoe member.

3. A single lens reflex camera internally housing a drive motor which is used to wind or rewind a film comprising a transmission connected to said drive motor for transmitting the rotation of the motor to a film winding assembly and film rewind assembly, said drive motor and said transmission being disposed in the bottom of the body of said camera, the top surface of the camera body having a pentaprism housing which is disposed substantially in its central region to project therefrom, said pentaprism housing having a pair of sides substantially symmetrically bevelled, said top surface of the camera body having a first surface on one side of the pentaprism housing and a second surface on the other side of said pentaprism housing, said first surface being formed at a lower elevation on said camera body than the elevation of said second surface to define a planar area in which a bore is formed, a light emitting component partially bevelled on its bottom surface and including a mounting element to be received in said bore for mounting said light emitting component on said planar area, said partially bevelled bottom surface mating with said planar area and with one of the pair of the bevelled sides of said pentaprism housing.

4. A single lens reflex camera according to claim 3 in which the light emitting component comprises an electronic flash assembly having a height which corresponds to a difference in elevation between the planar area and the maximum height of the pentaprism housing, the lower surface of the electronic flash assembly mating with the planar area, the electronic flash being laterally formed with a bevelled surface which mates with a corresponding lateral bevelled surface of the pentaprism housing when it is mounted on the body of the camera.

5. A single lens reflex camera according to claim 3 in which the light emitting component comprises an electronic flash assembly having a generally rectangular configuration and is laterally formed with a bevelled surface for mating engagement with a corresponding bevelled surface of the pentaprism housing when it is mounted on the body of the camera and the lower surface of the electronic flash assembly mates with the planar area.

6. A single lens reflex camera according to claim 5 in which the light emitting component internally houses a battery.

7. A single lens reflex camera according to one of claims 4 or 5 in which said mounting element is a threaded bolt member and said bore comprises a threaded bore, and in which said light emitting component carries in its lower surface said threaded bolt member which is adapted to be threadably engaged with said threaded bore to fix said light emitting component on the planar area.

8. A single lens reflex camera according to claim 7 further including a terminal connection member which comprises a substrate having a plurality of electrode patterns imprinted thereon, a plurality of conductive coiled springs adapted to engage the electrode patterns, a plurality of conductive connection terminals which are equal in number to the number of springs and which are urged by the springs, an insulating plate having a plurality of holes formed therein which receive the connection terminals and the coiled springs, and set screws for integrally connecting the substrate and the insulating plate together.

9. A single lens reflex camera according to claim 8 in which each of the connection terminals comprises a disc and a solid cylindrical contact member extending downwardly from the center of the disc.

10. A single lens reflex camera according to claim 7 in which the threaded bolt member comprises a disc and a screw extending downwardly from the center of the disc, the screw being rotatably received in the light emitting component so that the disc partly projects from the rear surface of the component.

*11. A single lens reflex camera internally housing a drive motor which is used to wind or rewind the film comprising a transmission connected to said drive motor for transmitting the rotation of the motor to a film winding assembly and film rewind assembly, said drive motor and said transmission being disposed within the body of said camera, the top surface of the camera body having a pentaprism housing which is disposed substantially in its central region to project therefrom, said pentaprism housing having a pair of sides substantially symmetrically bevelled, said top surface of the camera body having a first surface on one side of the pentaprism housing and a second surface on the other side of said pentaprism housing, said first surface being formed at a lower elevation on said camera body than the elevation of said second surface to define a planar area in which a bore is formed, an accessory shoe member which comprises a platform having a height which corresponds to a difference in elevation between the planar area and the second surface of the camera located on the opposite side of the pentaprism housing and shaped to cover the planar area, said accessory shoe member including a mounting element to be received in said bore for mounting said accessory shoe member on said planar area, and a hot shoe centrally mounted on the upper surface of the platform for receiving a light emitting component.*

*12. A single lens reflex camera internally housing a drive motor which is used to wind or rewind a film comprising a transmission connected to said drive motor for transmitting the rotation of the motor to a film winding assembly and film rewind assembly, said drive motor and said transmission being disposed within the body of said camera, the top surface of the camera body having a pentaprism housing which is disposed substantially in its central region to project therefrom, said pentaprism housing having a pair of sides substantially symmetrically bevelled, said top surface of the camera body having a first surface on one side of the pentaprism housing and a second surface on the other side of said pentaprism housing, said first surface being formed at a lower elevation on said camera body than the elevation of said second surface to define a planar area in which a*

*bore is formed, a light emitting component partially bevelled on its bottom surface and including a mounting element to be received in said bore for mounting said light emitting component on said planar area, said partially bevelled bottom surface mating with said planar area and with one of the pair of the bevelled sides of said pentaprism housing.*

*13. A single lens reflex camera comprising a camera body, the top surface of the camera body having a pentaprism housing which is disposed substantially in its central region to project therefrom, said pentaprism housing having a pair of sides substantially symmetrically bevelled, said top surface of the camera body having a first surface on one side of the pentaprism housing and a second surface on the other side of said pentaprism housing, said first surface being formed at a lower elevation on said camera body than the elevation of said second surface to define a planar area in which a bore is formed, an accessory shoe member which comprises a platform having a height which corresponds to a difference in elevation between the planar area and the second surface of the camera located on the opposite side of the pentaprism housing and shaped to cover the planar area, said accessory shoe member including a mounting element to be received in said bore for mounting said accessory shoe member on said planar area, and a hot shoe centrally mounted on the upper surface of the platform for receiving a light emitting component.*

*14. A single lens reflex camera comprising a camera body, the top surface of the camera body having a pentaprism housing which is disposed substantially in its central region to project therefrom, said pentaprism housing having a pair of sides substantially symmetrically bevelled, said top surface of the camera body having a first surface on one side of the pentaprism housing and a second surface on the other side of said pentaprism housing, said first surface being formed at a lower elevation on said camera body than the elevation of said second surface to define a planar area in which a bore is formed, a light emitting component partially bevelled on its bottom surface and including a mounting element to be received in said bore for mounting said light emitting component on said planar area, said partially bevelled bottom surface mating with said planar area and with one of the pair of the bevelled sides of said pentaprism housing.*

*15. A single lens reflex camera according to claim 14 in which the light emitting component comprises an electronic flash assembly having a height which corresponds to a different in elevation between the planar area and the maximum height of the pentaprism housing, the lower surface of the electronic flash assembly mating with the planar area, the electronic flash being laterally formed with a bevelled surface which mates with a corresponding lateral bevelled surface of the pentaprism housing when it is mounted on the body of the camera.*

*16. A single lens reflex camera according to claim 14 in which the light emitting component comprises an electronic flash assembly having a generally rectangular configuration and is laterally formed with a bevelled surface for mating engagement with a corresponding bevelled surface of the pentaprism housing when it is mounted on the body of the camera and the lower surface of the electronic flash assembly mates with the planar area.*

*17. A single lens reflex camera according to claims 13 or 14 further including a terminal connection member which comprises a substrate having a plurality of electrode patterns imprinted thereon and a plurality of conductive connection terminals.*

* * * * *